(12) United States Patent
Kauhaniemi et al.

(10) Patent No.: US 6,733,005 B2
(45) Date of Patent: May 11, 2004

(54) TWO-PART DEVICE

(75) Inventors: Ilpo Kauhaniemi, Vantaa (FI); Antti Rönkkö, Espoo (FI); Matti Kosonen, Järvenpää (FI); Eero Mäki-Tulokas, Vaskio (FI); Tomi Kanninen, Salo (FI)

(73) Assignee: Nokia Corporation, Espoo (FI)

( * ) Notice: Subject to any disclaimer, the term of this patent is extended or adjusted under 35 U.S.C. 154(b) by 101 days.

(21) Appl. No.: 10/128,443

(22) Filed: Apr. 23, 2002

(65) Prior Publication Data

US 2002/0175457 A1 Nov. 28, 2002

(30) Foreign Application Priority Data

Apr. 27, 2001 (FI) .............................. 20010894

(51) Int. Cl.7 ................................. F16F 1/10
(52) U.S. Cl. ............... 267/156; 74/89.2; 455/575.4; 455/90.3
(58) Field of Search ............... 74/89.2, 89.22; 267/156, 272; 379/433.01, 433.11, 433.12; 455/550.1, 575.1, 575.4, 90.2, 90.3

(56) References Cited

U.S. PATENT DOCUMENTS 5,232,208 A * 8/1993 Braid et al. ............... 267/156
6,374,089 B1 * 4/2002 Till .......................... 455/90.1
2001/0009847 A1 * 7/2001 Kim et al. .................. 455/90
2001/0031644 A1 * 10/2001 Eromaki .................... 455/550
2001/0053674 A1 * 12/2001 Katoh ....................... 455/90

FOREIGN PATENT DOCUMENTS

| EP | 0414364 A2 | 2/1991 |
| EP | 1 075 125 A2 | 2/2001 |
| EP | 1 150 476 A2 | 10/2001 |
| JP | 9105435 | 4/1997 |

* cited by examiner

Primary Examiner—Robert A. Siconolfi
Assistant Examiner—Bradley King

(57) ABSTRACT

The invention relates to an electromechanical structure of an extendable electrical device comprising a body part (300) and a sleeve-like grip part (301). The smooth longitudinal movement between a retracted and extended position is effected by a clockspring in a spring barrel (302). A belt is wrapped around the barrel, and a slide part (306) is attached to the free end of the belt. When the device is retracted, the slide part with the belt slides along a longitudinal groove (304) made on at least one side of the body part until the slide part is interlocked. In response to pushing a releasing element, the interlocking is released, whereupon the belt is wrapped around the barrel and the body part slides smoothly to extended position.

12 Claims, 4 Drawing Sheets

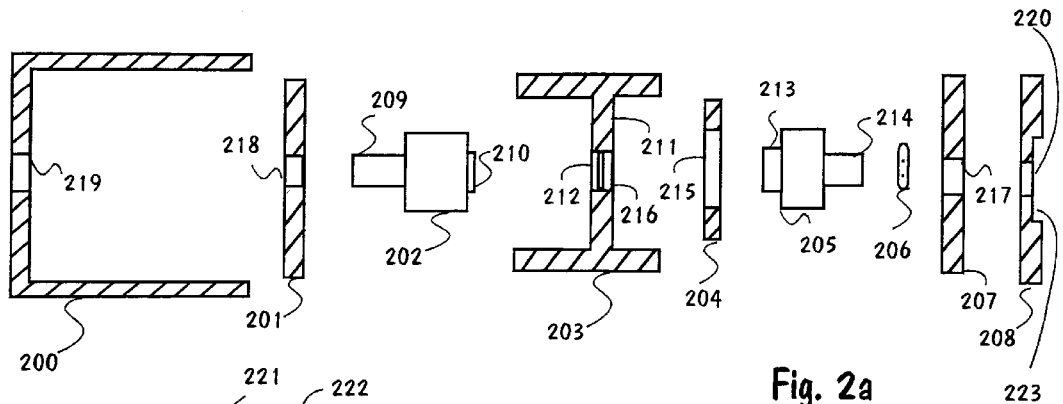
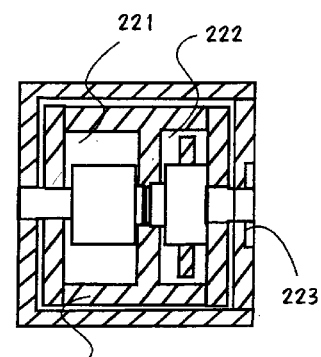
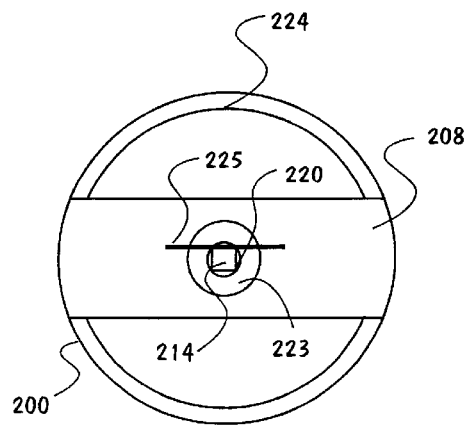
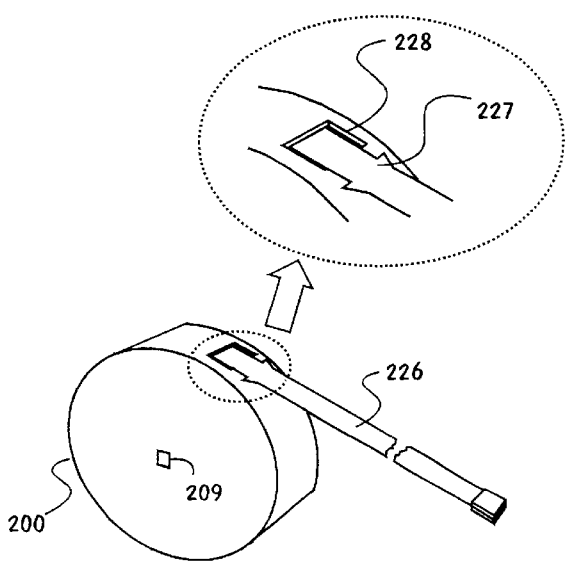

TWO-PART DEVICE

FIELD OF THE INVENTION

The present invention relates generally to an electromechanical structure of an electrical apparatus.

BACKGROUND OF THE INVENTION

The size of portable electronic equipment in particular is being constantly reduced. This makes great demands, such as on the usability and durability of the various mechanical components in the equipment.

The physical components of electronic equipment are constructed to be simple and cheap, suitable for mass production, and easy to install on automated assembly lines. The components must additionally be designed so that various tolerance variations occurring in the components will not obstruct the installation or lessen the performance of the equipment.

Examples of small electronic equipment containing mechanically movable components are mobile terminals, CD stations, and CD players. The smallest mobile terminals are physically so tiny that when the loudspeaker is held to the ear, the microphone does not reach all the way to the user's mouth without special arrangements. Mobile terminals of this kind can be enlarged with the aid of a telescope structure or with some other enlargement implementation, such as a collapsible structure. The force needed for the enlargement can be supplied by the user or obtained, for example, from a spring or a motor.

A mobile terminal including a body part and a grip part is described in the applicant's earlier patent application FI20001008, which has not been published by the filing date of the present application.

FIG. 1a illustrates a structure for an extendable mobile terminal in a retracted configuration, where a relatively large portion of a body part 100 is located within a sleeve-like grip part 101. The grip part is mounted for longitudinal slidable movement between a retracted position and an extended position.

FIG. 1b illustrates the same telephone device in an extended configuration, where the body part has been moved into a longitudinal direction so that a larger portion thereof has been extended from the grip part.

The force needed for the opening movement is obtained from a torsion spring at the bottom of the grip part when the one-sided releasing switch is released. In another embodiment the force needed for the opening movement is obtained from a cogged rack with a gear wheel.

In the same application a solution is described whereby a spring barrel is used. The spring barrel, wherein a spring and a bi-directional damper are combined, is installed in the body part of the mobile terminal. When the mobile terminal is in the closed position, i.e. the body part is within the sleeve-like grip part the spring is compressed, i.e. the spring is in its stressed state. When the releasing latch between the body part and the grip part is released, the stored force of the spring pushes out the body part of the mobile terminal from the grip part into the extended or operative position. A damper slows down the mechanical movement of the body part in relation to the grip part. More specifically, the mechanical movement of the body part is controlled by a bi-directional damper, which absorbs a part of the spring force in order to prevent the body part from jumping out suddenly and noisily into the enlarged position. When the use of the mobile terminal has been terminated, the spring is reset, i.e. the body part is pushed down manually down into the grip part.

However, one drawback of the described solution is that the damper may not function in the normal manner at low temperatures (below 0° C., for example). This is mainly due to the behavior of the damping oil of the damper housing. The oil solidifies and thus causes high torque and stress to the mechanical components of the spring barrel. This results in serious malfunction: the opening mechanism of the mobile terminal works very slowly, if at all.

In addition, should the damper not work or should it work very slowly, there is always the risk that the frustrated user will become impatient and try to open or close the equipment by force. In the worst case such behavior may break the mechanical components of the spring barrel.

Another drawback is that the movable part of the known extendable mobile terminals is not designed to be exchangeable. Thus, the movable part cannot be replaced with a new part having a different color, material, or shape.

In general, the opening mechanism in known solutions is still rather complex and expensive from the standpoint of manufacturing.

SUMMARY OF THE INVENTION

The invention especially concerns a two-part device comprising at least one spring module, whereby a flat belt-like spring is used to obtain for smooth movement for that component of the electronic equipment which is adapted to be movable.

It is an objective of the present invention to bring about a two-part device in such a way that the drawbacks mentioned above are eliminated. The intention is to implement the spring barrel module with the belt-like spring in such a way that its manufacture is economically advantageous, its installation is simple, and it tolerates various tolerance variations occurring in the components.

This objective is achieved in the manner described in the independent claim. Advantageous embodiments of the invention are defined in the dependent claims.

In the first embodiment of the invention, a spring barrel module consists of a first and a second cylindrical barrel, where the first barrel is adapted to rotate within the second barrel. The first barrel includes a spring and a damper, as well as a belt-like spring extending along the outer periphery. The first end of the belt-like spring is attached to the barrel and the second end to a slide element. The damper works in one direction only. Unidirectional damping is implemented by a one-way clutch.

The barrel can be delivered with a pre-tensioned belt-like spring. The outer barrel can be arranged to ensure that the belt-like spring can be kept pre-tensioned. This is especially important from the standpoint of mounting.

During use the second or outer barrel functions as a means controlling the belt-like spring and also protects the first barrel from dust and dirt.

In the second embodiment of the invention, the spring barrel module consists of one cylindrical barrel including a spring and a damper, as well as a belt-like spring extending along the outer periphery. The barrel is adapted to rotate within a hole in the body of the equipment in question.

When the movable part of the electronic equipment is in its closed position, the spring in the spring barrel module is in its stressed state. When the spring is released, the spring force is converted by a spring barrel adapted to rotate and by a belt-like spring into linear or rotary motion. In other words, the belt-like spring with the slide element slides along a groove in the equipment from its first position to its second position. Thus, that part of the electronic equipment which is adapted to move will open in a controlled and smooth manner.

When the movable part is closed, e.g. by pushing it manually, the belt-like spring with the slide element slides along the groove from the second position to the first position and the spring will reset.

It is especially advantageous to mount two spring barrels symmetrically on opposite sides of the equipment. When the electronic equipment is extended/retracted, the slide element with the belt slides along longitudinal grooves on the opposite side of the equipment. Thus, the system consisting of the barrel, the belt-like spring, and the slide element act as a bearing element between the body part and the movable part of the equipment.

The body part and the movable part can be fixed together in such a way that the movable part is easy to remove and replace with a new movable part if required.

BRIEF DESCRIPTION OF THE DRAWINGS

The invention is described more closely with reference to the accompanying drawings, in which

FIG. 2a is an exploded view of such components of a spring barrel module which are essential to the invention;

FIG. 2b shows the spring barrel module of FIG. 2a in its assembled state;

FIG. 2c illustrates the spring barrel module;

FIG. 2d illustrates the spring barrel module with a belt-like spring;

DETAILED DESCRIPTION OF THE PREFERRED EMBODIMENT

Figure 1A:
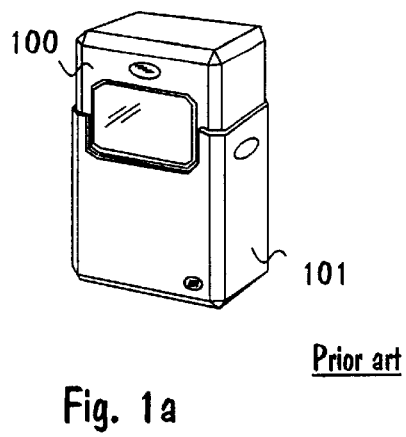
FIGS. 1a–1b illustrate a structure of an extendable mobile terminal.
Figure 1B:
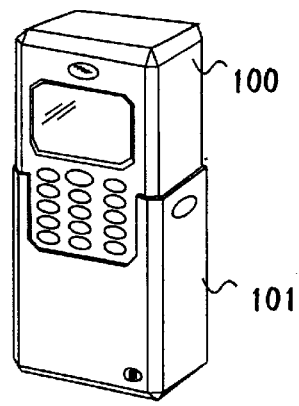

FIG. 2a with the aid of an exploded view illustrates the basic structure of a spring barrel module installed inside an outer barrel and provided with two separate fixed spindles.

The spring barrel module includes an outer barrel 200, a spring chamber cap plate 201, a spring spindle 202, a spring (not shown in the figure), a barrel frame 203, a damper plate 204, a damper spindle 205, an O-ring 206, a damper chamber cap plate 207, and a barrel end piece 208.

FIG. 2b illustrates the same spring barrel module in its assembled state.

It is obvious from FIGS. 2a and 2b how the spring barrel module is assembled.

Spring spindle 202 is a uniform piece, the cross-section of which is circular, however, so that the cross-section of the first end 209 of the spindle is many-sided, preferably the part fitting into the cap plate 201 hole being square. The cross-sectional diameter of the spring spindle varies when the spindle is viewed in the longitudinal direction from the first end 209 to the second end 210, in such a way, however, that the spring spindle is symmetrical in relation to the central axis extending in the longitudinal direction. The relative axial lengths of the spindle parts have different cross-sectional dimensions depending on the application used.

Barrel frame 203 is shaped as a uniform cylindrical body without cap and bottom. Essentially midway in the cylindrical body there is a partition 211 having a circular cross-section, the diameter of which is equal to the cylinder diameter. The partition is at right angles to the cylinder walls forming two separate open chambers: a first chamber and a second chamber.

The second end 210 of the spring spindle can be pushed at right angles into an essentially round hole 212 located in the middle of the partition, which divides the barrel frame into chambers. The hole does not extend all the way through the partition. The inner end of the clock spring (not shown in the figure) is attached mechanically to that part of the spring spindle which is located in the spring chamber. On the other hand, the outer end of the clock spring is attached to the inner wall of the spring chamber in the barrel frame. As known, a clock spring is a spirally wound strip-like steel spring wire.

Damper spindle 205 is a uniform piece which is symmetrical in relation to the central axis in the longitudinal direction of the spindle, the first end 213 of which has a circular cross-section and the second end 214 of which is essentially many-sided, preferably square. The relative lengths of the first end and the second end of the spindle in the longitudinal direction of the spindle depend on the application used.

Damper plate 204 has a circular cross-section with a smaller diameter than the frame barrel diameter. The first end 213 of the damper spindle can be pushed at right angles through a circular hole 215 located essentially in the middle of the damper plate. The diameter of the hole is almost as large as the largest diameter of the damper spindle. In addition, essentially in the middle of the bottom of the second chamber in the barrel frame there is a hole 216 corresponding to the cross-section of the first end of the damper spindle, into which hole the spindle end 213 can be pushed. The hole does not extend all the way through the bottom.

An O-ring 206 is mounted around the second end 214 of the damper spindle in such a way that it is compressed between that part of the spindle which is thickest in diameter and the cap plate of the damper chamber.

In cross-section, the spring chamber cap plate 201 and the damper chamber cap plate 207 are essentially circular plate-like uniform bodies. They may be straight or bent into shape, depending on the application. Essentially in the middle of the damper chamber cap plate 207 there is a circular hole 217, through which the second end 214 of the damper spindle can be pushed at right angles. The diameter of the hole is almost equal to the diameter of the second end of the damper spindle.

Essentially in the middle of the spring chamber cap plate 201 there is a circular hole 218, which has a diameter allowing the first end 209 of the spring spindle to be pushed at right angles through the hole.

When the spring chamber cap plate 201, the barrel frame 203, and the damper chamber cap plate 207 are attached to each other, they form together a closed cylindrical barrel, inside which there are two separate chambers. The clock spring is located in the first chamber 221, and the damper is located in the second chamber 222 (see FIG. 2b). The second chamber is filled with some known damper viscous liquid. The choice of damper liquid does not restrict the invention.

The O-ring 206 prevents the liquid from leaking through the central hole in the cap plate of the damper chamber. There is no liquid in the first chamber.

The first cylindrical barrel described above is closed within a second outer cylindrical barrel or a capsule, which is large enough in dimension so that the first barrel (forced by the clock spring) can rotate inside it around the spring spindle 202. The second outer barrel is fixed; it does not rotate.

The capsule is formed by two pieces: by a straight-walled cylindrical piece 200, which has a bottom, and an end piece 208. The end piece in this example is a bridge-like piece, which extends diametrically over the open end of the cylindrical piece. Depending on the application, the end piece may also be of some other shape. It can, for example, be arranged to clamp the cylindrical piece 200 to the end piece 208.

In the bottom of the cylindrical outer piece 200, essentially in the middle, there is a square hole 219 through which the first end of the spring spindle can be pushed. Essentially in the middle of the end piece 208 there is a circular hole 220, through which the second end 214 of the damper spindle can be pushed. The hole diameter is large enough to permit smooth motion of the second end 214 when needed. A circular groove 223 surrounds the hole.

The first end 209 of the spring spindle and the second end 214 of the damper spindle are attached to the body of the equipment in question.

FIG. 2d shows how the belt-like spring can be installed.

The spring barrel module includes a pre-tensioned belt-like spring extending along the outer periphery. One end of the belt-like spring is attached to the spring barrel in some suitable way by riveting, by welding, or by gluing, for example. The belt-like spring 226 may have one or more stopper to prevent the belt from unwinding. Advantageously the shape of the belt-like spring is designed to include stoppers 227. Alternatively, the stoppers are separate elements. In the side wall of the outer barrel 200 is an opening 228 through which the other end of the belt-like spring extends. The above-mentioned components may be made of different metals or alloys. However, the choice of material for the components does not limit the invention. It is essential that the components adapted to move mechanically are made of a sufficiently durable material.

FIG. 2c illustrates the spring barrel module when looking at the barrel from the direction of the end piece 208. The first spring barrel 224 is within the second barrel 200. As already stated above, the second end 214 of the damper spindle is pushed through the hole 220 in the end piece 208. An overload clutch can be mounted in the groove 223.

Unidirectional dampening can be carried out by mounting in the groove some known one-way clutch, such as a notch wheel, a spiral spring clutch, a roller clutch, or a wedge clutch. Without the clutch, the damper spindle and the damper plate would rotate with the first barrel. If the damper spindle is fixed to the end piece, the damper acts bi-directionally.

As an example, a spring wire 225 is used as an overload clutch in FIG. 2c, limiting the maximum torque between the rotating damper spindle and the fixed end plate 208. At overload the damper spindle rotates with the first barrel. The spring wire may be of super-elastic material with a sufficiently low transition temperature, e.g. −10° C. Below the transition temperature, the structural phase of the super-elastic material changes and the spring loses its spring characteristics. If the ambient temperature should drop below −10° C. degrees, the damper spindle will still rotate quite freely, i.e. there would not be notable dampening.

In the second embodiment of the invention, the spring barrel module consists of one cylindrical barrel including a spring and a damper, as well as a pre-tensioned belt-like spring extending along the outer periphery. The barrel is adapted to rotate within a housing in the body of the equipment in question, whereby the housing functions as a means controlling the said belt-like spring.

Hereafter the belt-like spring will simply be referred to by the short term "belt".

The following is an examination with reference to FIGS. 3-4 of different examples showing how the force obtained from the spring of the spring barrel module can be passed on to that part of the equipment which is adapted to move. It is assumed that the equipment is a mobile terminal of the kind described above.

Figure 3A:
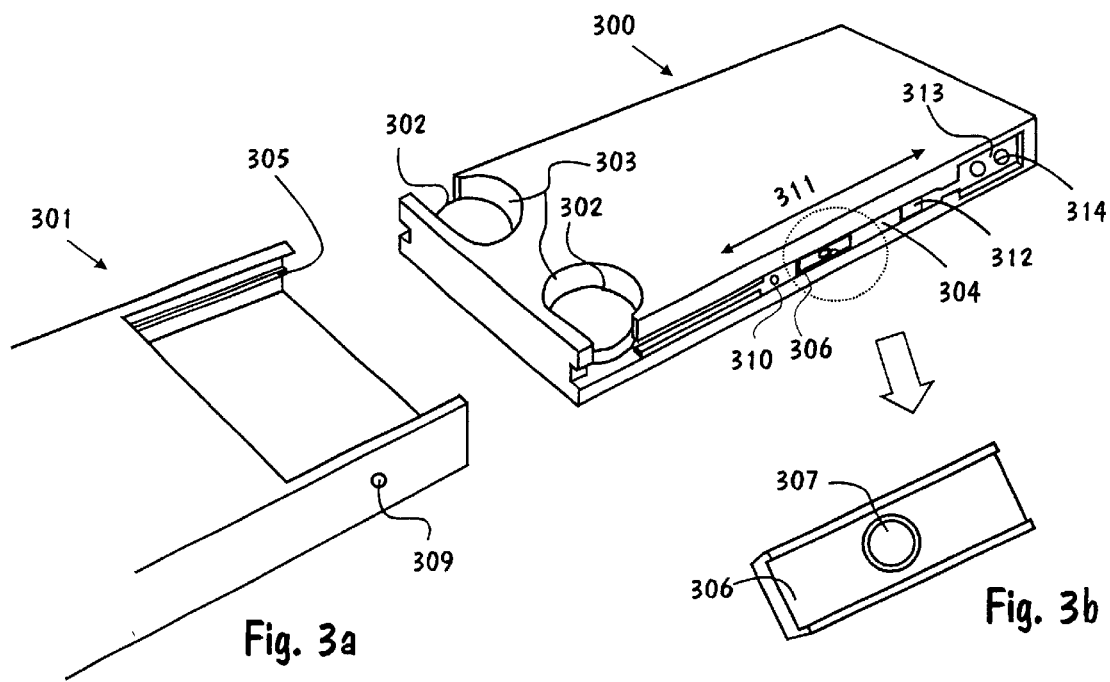
FIGS. 3a–3c depict the structure of an extendable mobile terminal.

FIG. 3a shows a simplified example of the structure of an extendable mobile terminal. The body part 300 and the grip part 301 are separated in the figure.

The body part is an elongated piece having a front and a back surface, two parallel side surfaces, a top and a bottom surface. The front surface is the one which has the keypad (not shown in the figure). The back surface is the one which is parallel to the front surface and not visible in the figure. The two side surfaces are those mutually parallel surfaces that are essentially perpendicular to the front and back surfaces. The body part includes most of the electrical parts of the mobile terminal.

The grip part has a cavity for receiving at least part of the body part. It is limited by front and back surfaces, two parallel side surfaces, and a bottom surface. The front surface is the one covering the keypad of the body part in the retracted configuration. The back surface is the one parallel to the front surface. Its inner surface is partly visible in the figure. The two side surfaces are those mutually parallel surfaces which are essentially perpendicular to the front and back surfaces. A hole 309 for a locking mechanism is located on both the parallel side surfaces.

In this example, the body part comprises two spring barrel modules 302 located symmetrically in housings 303 at the opposite corners. The spring barrel modules may be, for example, the type described in FIG. 2. The durability of the spring barrel module is strengthened in such a way that the first end of the spring spindle and the second end of the damper spindle are attached to the body part (not shown in the figure). The body part comprises also a pair of grooves 304 symmetrically on the side surfaces. Correspondingly, the opposite side surfaces on the inside of the grip part are provided with guides 305. The guides are intended to slide along the grooves when the body part is slid longitudinally with respect to the grip part, either to an extended position or a retracted position.

The first spring barrel has a belt extending along the outer periphery as described above. The material of the belt is advantageously metal but it may also be some other material which is sufficiently rigid. The other end of the belt is attached to a slide part 306. The belt may be attached to the spring barrel and the slide part in many different ways: by riveting, by welding, by gluing, etc.

Figure 3B:
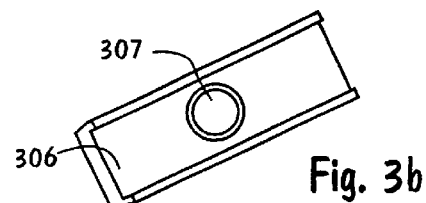
Figure 3C:
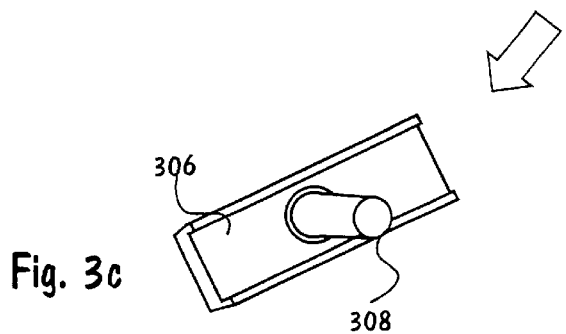

FIG. 3b illustrates the slide part more closely. The slide part is an elongated metal piece having a hole 307 for a locking button 308 shown in FIG. 3c. The locking button is kept in place in the slide part, for example, by an o-ring.

The grip part and the body part of the mobile terminal can be fixed together with the locking button. The locking button is installed with the help of a battery hole 310 located symmetrically on both of the side surfaces. First the locking button is pushed into the battery hole. When the hole of the slide part 307 and the hole of the grip part 309 meet, the locking button can be pushed through them.

In the retracted position of the terminal, a claw 312 locks the slide part to prevent the movement of the body part into the extended position. Pressing the locking button releases the locking, whereby the belt forced by the clock spring will draw the slide part with the grip part. The guide 305 of the grip part, together with the slide part, slides along the groove to the extended position of the terminal. Simultaneously the band winds around the outer periphery of the first spring barrel.

When the body part is pushed manually into the grip part, i.e. into the retracted position, the above steps are carried out in reverse order. Thus, the belt pushes the slide part with the grip part, whereby the guide of the grip and the slide part slide along the groove to the retracted position.

The moving area of the slide part is shown in the figure by a double-ended arrow 311.

Details pertaining to the locking of the grip part and the body part into the retracted position are to be described next. The locking element, here called trigger plate, is advantageously a shaped piece of metal 313 having a spring forced claw 312 with the slide part locked. In other words, the claw of the trigger plate locks the slide part when the terminal is in its retracted position. The trigger plate is fastened with screws 314 in the groove 313. When the trigger button 308 is pushed, the claw releases the slide part and the belt draws the slide part along the groove 304, i.e. the body part slides smoothly out from the grip part to the extended position. Thus, the locking button has two functions: on the one hand it locks the grip part and the slide part together, and on the other hand it releases the body part to move to the open position.

The locking button is removable. When the button is pushed into the battery hole 310, the grip part and the body part can be separated so that it is possible to replace the grip part with another. Thus a grip part replacement can be of a different shape or color, for example.

There are numerous implementation alternatives for the detachment of the locking button. One alternative is that the locking button is detached by pushing the button down to the bottom with the help of a thin pin. The new grip part may also be replaced in a service shop.

Figure 4A:
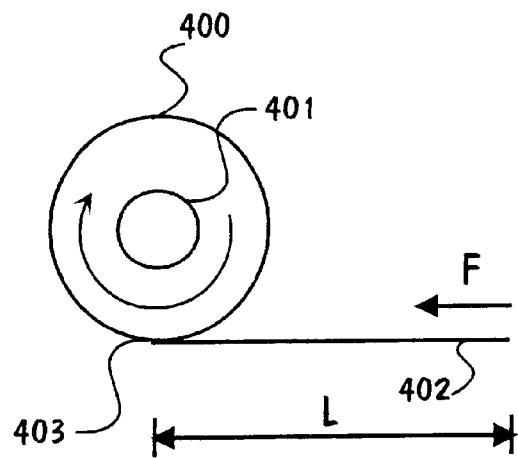
FIGS. 4a–4b illustrate how the force obtained from the spring barrel module is passed on through a belt/wire.

FIG. 4a illustrates the spring barrel 400 when looking at the spring barrel from the axial direction. The spring spindle 401 is located in the middle at right angles to the paper plane. The force obtained from the clock spring rotates spring barrel 400, whereby the belt attached by its first end to the outer periphery of the barrel at point 403 unwinds from around the barrel, and the body part of the mobile terminal emerges from the grip part. When the body part of the mobile terminal is pushed back into the grip part, the spring spindle rotates in the opposite direction to the one when opening: the spring spindle is reset, and the belt winds around the spring spindle.

Figure 4B:
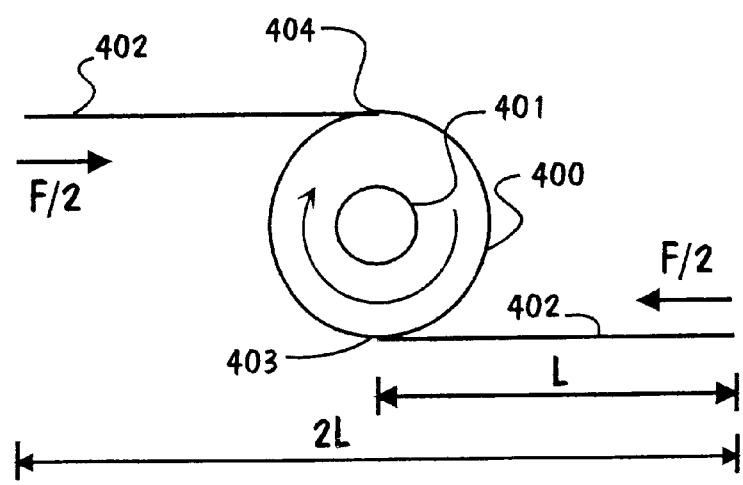

FIG. 4b shows a solution similar to the situation shown in FIG. 4a, except that in this example two wires or belts are attached to the spring barrel in the manner shown by the figure at points 403 and 404. The first end of the belt may be attached to the outer periphery of the spring barrel, either on the same plane or on a different plane in relation to the longitudinal direction of the spring barrel axis. The second outer end of the belt is attached to the equipment used in such a way that their points of attachment are located in the equipment in different directions at right angles to the spring spindle.

The following is an examination with reference to FIG. 5 of different examples of how the locking of the grip part and the body part can be achieved.

Figure 5A:
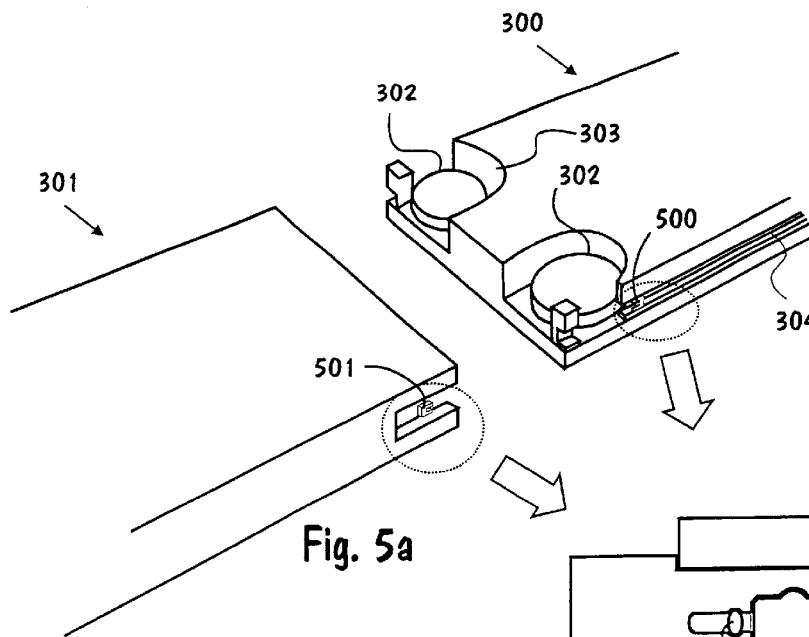
FIGS. 5a–5e illustrate the structure of another extendable mobile terminal and its locking mechanism.
Figure 5B:
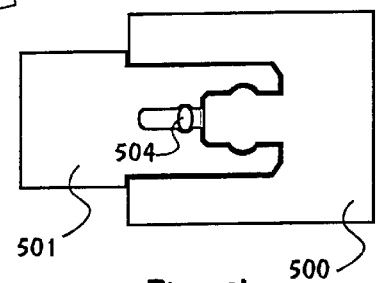
Figure 5D:
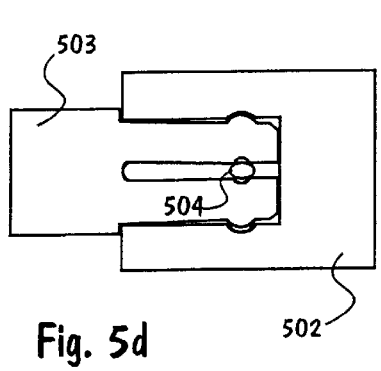
Figure 5C:
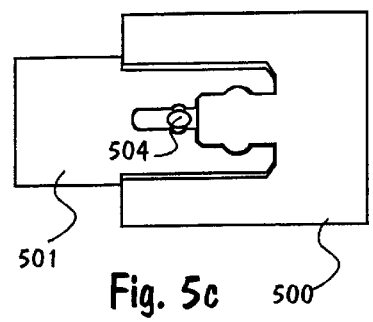
Figure 5E:
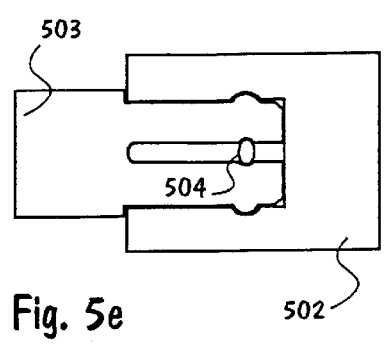

FIGS. 5a–5e shows an exemplary embodiment for the locking mechanism comprising in the grip part a fork shaped locking part 501 and in the body part a slide part 500 which is provided with a tongue. In practice, the opening on the side surface in FIG. 5a is closed, and the first locking part is attached to the inner side of the said surface.

Pushing the grip part and the body part against each other locks the locking parts automatically, at the latest when the terminal is in its closed position. The tongue penetrates the locking element and locks into the fork. The locking parts can be set into motion in several different ways. A most practical and economical way is to use shaped springs 500–503 which are locked by an eccentric peg 504. This kind of coupling allows for some dimensional changes between the body part and the grip part, since the coupling is fixed after the eccentric peg has been rotated 90°.

Although the invention is designed to be especially suitable for small-sized equipment, the invention is not limited to application for such equipment of a small size. It is clear that the described barrel type spring actuator using a flat belt-like spring may be built into equipment of any size.

Of course, the application determines where the spring barrel module is installed and how many spring barrel modules are to be installed in the equipment. Thus, it is possible to mount only one spring barrel instead of two. However, this alternative is not recommended, since symmetrical bearing is thereby lost. The spring barrel used can also be of some other kind than what has been described in the examples above.

It should be noticed that there are many different application possibilities. Depending on each application, the spring barrel is installed in the equipment at the most suitable point. This means in practice that even in different variations of similar equipment, the location of the spring barrel can vary for either technical or aesthetic reasons.

The material of the belt does not restrict the invention, and instead of the belt also a wire can be used. However, if wire is used, there are many drawbacks, including the attachment and functioning of the wire.

Although different ways of implementation have been described in the foregoing with reference to a mobile terminal, the barrel type spring actuator using flat belt-like spring may be installed in equipment of any kind where smooth linear or rotary motion is required. There are very many different applications; a disk tray of CD/DVD stations and a computer keyboard emerging from under a tabletop are mentioned as examples.

What is claimed is:

1. A device comprising:
    a body part,
    a grip part having a cavity for receiving at least a portion of the body part,
    at least one spring module arranged on the body part, comprising a cylindrical barrel, a spring spindle, and a spring within the cylindrical barrel, one end of the spring being fixed to the spring spindle and the other end of the spring being fixed to the barrel, and
    a damper element comprising a damper plate and a damper spindle for damping the rotation of the cylindrical barrel upon the release of tension in the spring, a longitudinal groove made on at least one side of the body part, a belt partially wrapped around the barrel, the other part of the belt being located in the groove, a slide part attached to the free end of the belt, the slide part being adapted to slide in the groove, a claw element fixed at the end of the groove for receiving and interlocking with the slide part, a locking element for retaining the slide part, fixed in a side wall of the grip part, a releasing element for releasing the interlocking of the claw element and the slide part, wherein after sliding the body part into the cavity of the grip part, the slide part, together with the belt, slides in the groove and tenses the spring until the slide part and the claw element are interlocked, and when the releasing element is pushed, interlocking is released, whereupon the spring winds the belt around the barrel and ejects the body part from the cavity of the grip part.

2. A device as claimed in claim 1, wherein the spring module is mounted within a capsule having a slot for the belt.

3. A device as claimed in claim 1, wherein the body part comprises a housing into which the spring module is mounted.

4. A device as claimed in claim 2, wherein the capsule has an opening through which a first end of the damper spindle extends.

5. A device as claimed in claim 4, wherein the first end of the damper spindle is many sided, and near the opening of the capsule is a spring pin pressed against the damper spindle and operating as an overload clutch.

6. A device as claimed in claim 5, wherein the overload clutch is selected from a material losing its elasticity at a predetermined temperature.

7. A device as claimed in claim 2, wherein the belt is provided with a stopper having dimensions greater than the slot, whereby when wrapping the belt around the barrel the stopper prevents further wrapping in order to maintain pre-tension of the spring.

8. A device as claimed in claim 4, wherein a one-way clutch is arranged at the first end of the damper spindle, so that when the spring is released the damping element dampens the rotation of the barrel.

9. A device as claimed in claim 1, wherein
both the slide part and the side wall of the grip part are provided with a hole, and
the releasing element has a pin extending through both the holes.

10. A device as claimed in claim 9, wherein the pin is removable.

11. A device as claimed in claim 1, wherein the locking element has a fork-shaped end and the slide part is provided with a tongue, so that when the body part and the grip part are pushed against each other the tongue penetrates into the locking element, whereby the fork-shaped end of the locking element is locked into the tongue.

12. A device as claimed in claim 1, wherein the locking element is the same as the releasing element.

* * * * *